United States Patent [19]
Dewalt

[11] Patent Number: 5,551,378
[45] Date of Patent: *Sep. 3, 1996

[54] AQUARIUM DISPLAY CONFIGURATION

[75] Inventor: Craig A. Dewalt, Long Beach, Calif.

[73] Assignee: California Aquariaum Supply, Cerritos, Calif.

[*] Notice: The term of this patent shall not extend beyond the expiration date of Pat. No. 5,413,070.

[21] Appl. No.: 393,135

[22] Filed: Feb. 21, 1995

Related U.S. Application Data

[63] Continuation of Ser. No. 82,251, Jun. 24, 1993, Pat. No. 5,413,070.

[51] Int. Cl.⁶ .................................................. A01K 63/00
[52] U.S. Cl. ............................................ 119/247; 119/253
[58] Field of Search .................................. 119/245, 247, 119/253, 257, 267, 269; 362/101

[56] References Cited

U.S. PATENT DOCUMENTS

| | | |
|---|---|---|
| 1,764,356 | 6/1930 | Scholtz . |
| 1,777,944 | 10/1930 | Trovato . |
| 1,838,215 | 12/1931 | De Clairmont . |
| 1,974,068 | 9/1934 | Greensaft . |
| 2,494,937 | 1/1950 | Gandy ........................................ 119/253 |
| 3,113,555 | 12/1963 | Overman ................................. 119/269 |
| 3,185,829 | 5/1965 | Rau ........................................... 119/247 |
| 3,225,736 | 12/1965 | Willinger et al. . |
| 3,638,616 | 2/1972 | Carmouche . |
| 3,696,789 | 10/1972 | Richard . |
| 4,300,478 | 11/1981 | Wise .......................................... 119/253 |
| 4,516,529 | 5/1985 | Lotito et al. .............................. 119/253 |
| 4,951,607 | 8/1990 | Lapeyre . |
| 5,067,438 | 11/1991 | Hoffa . |
| 5,073,115 | 12/1991 | Howell . |
| 5,076,210 | 12/1991 | Horn . |
| 5,197,409 | 3/1993 | Hammond ................................ 119/253 |
| 5,365,886 | 11/1994 | Frost, Jr. ................................... 119/267 |

FOREIGN PATENT DOCUMENTS

| | | | |
|---|---|---|---|
| 2407666 | 6/1979 | France ........................................ 119/245 |
| 423945 | 2/1935 | United Kingdom ..................... 119/269 |

Primary Examiner—Todd E. Manahan
Attorney, Agent, or Firm—Fulwider Patton Lee & Utecht

[57] ABSTRACT

The aquarium display system includes an aquarium tank, having a bottom wall portion, a rear side, and a front transparent wall portion viewable from a viewing location facing the front transparent wall portion and vertically displaced from the aquarium tank. The transparent front wall portion of the aquarium tank is inclined at an oblique angle to a horizontal plane to refract light from within the aquarium tank to the viewing location. This allows an increased volume within the tank to be viewable from the viewing location.

5 Claims, 2 Drawing Sheets

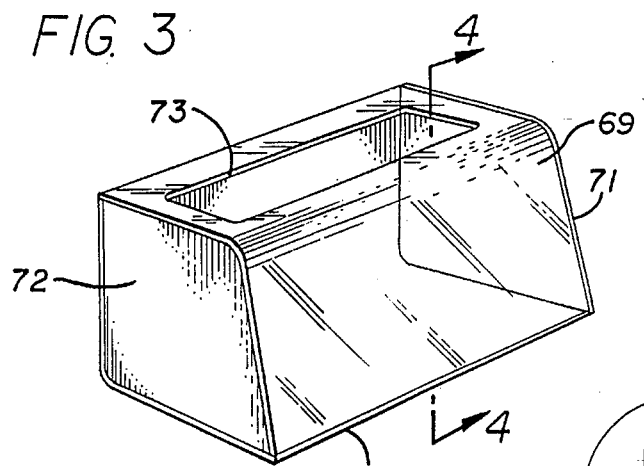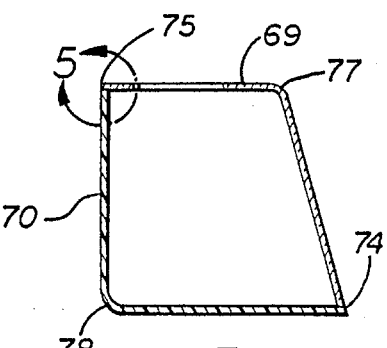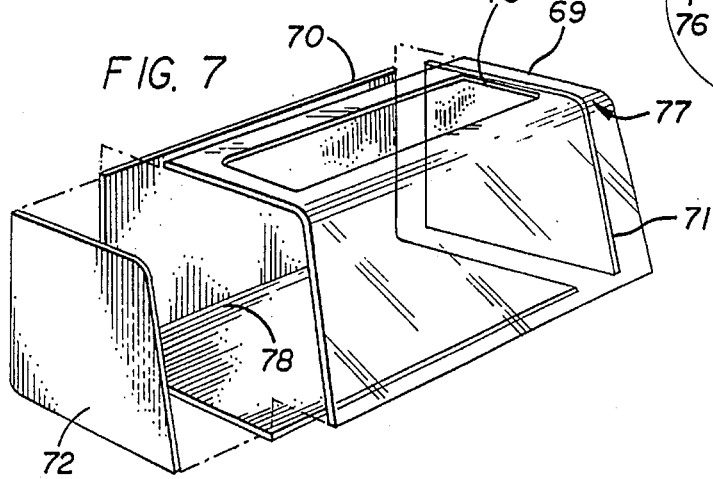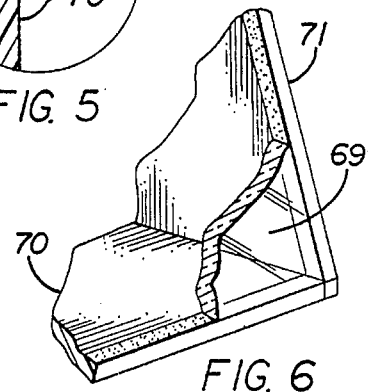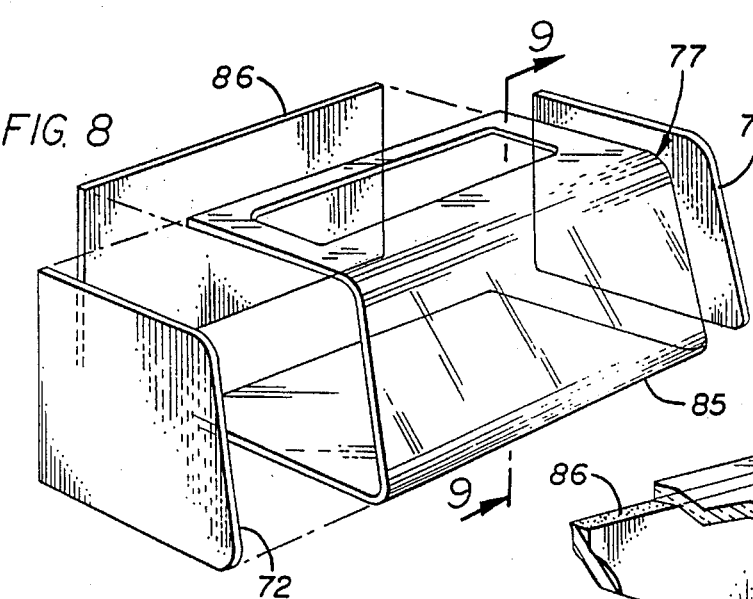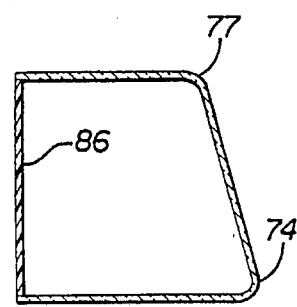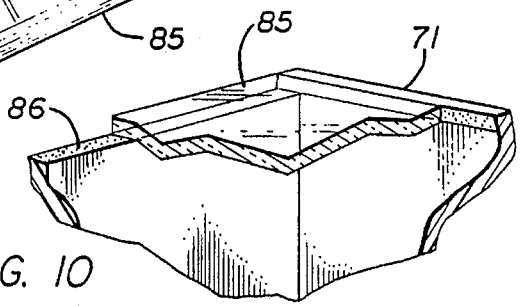

AQUARIUM DISPLAY CONFIGURATION

This is a continuation of application Ser. No. 08/082,251, filed Jun. 24, 1993, now U.S. Pat. No. 5,413,070.

BACKGROUND OF THE INVENTION

1. Field of the Invention

The invention relates generally to aquarium displays for displaying fish and other aquatic life. More particularly, the invention relates to an improved aquarium display configuration of the type where multiple aquarium tanks are placed in a vertically stacked relationship to provide increased display volume in a minimum of floor space.

2. Description of Related Art

In the field of aquarium displays it is very desirable to display species of fish and other aquatic life in a way that they can be closely observed by a viewer in a convenient manner. This is particularly true in a retail sales setting, where a display is for customers interested in purchase of the displayed aquatic life. Usually conflicting with this goal is the necessity to maximize the volume of water in a display per square foot of floor space occupied by the display, to achieve maximum economy in floor space used. This is a practical consideration in a retail setting, as floor space is at a premium.

Conventional aquarium displays for this purpose comprise wall or aisle displays where multiple aquarium tanks are configured one above another, supported by a vertically stacked stand or shelving arrangement. A significant drawback of such an arrangement is that an observer standing close to the display cannot see the entire volume of water in a display tank above eye level or a tank positioned relatively low, below eye level, in such a vertically staked aquarium tank display. Observers are required to either stoop down or somehow raise themselves, or back away a relatively large distance from the display to see all the contents of the tanks positioned relatively high or low in a stacked display system. The latter option is not desirable, as it is intended that the displayed species of fish and other aquatic life be observed closely by a customer. The former option is inconvenient for a customer and therefore highly undesirable. Consequently, in conventional stacked aquarium displays the top and bottom areas where aquarium tanks might otherwise be placed are unusable if the above-described problems are to be minimized.

Previous attempts at solving this problem have included making the bottommost aquarium tanks relatively thin in the front-to-back dimension so as to minimize the area of such tanks which is not observable by a customer standing requisitely close to the display. Of course this measure also minimizes the volume of water in the bottom tanks at the same time, with the result that little is actually gained in terms of display volume. Since overall display volume is the factor determining the number of fish or other aquatic forms that can be displayed per unit of floor space, this is not an entirely acceptable solution.

Other attempts at solving this problem involved providing a stepped arrangement of tanks, the aquarium tanks being stepped away from an aisle so that the lower tanks can be serviced from the top, but the tanks can be vertically crowded closer together to maximize the display volume within the usable height that is not too high or too low. This also places the upper tanks farther from the observer allowing more volume in the upper tanks to be observed. However, this solution is not satisfactory due to the fact that the configuration requires more floor space, which cancels any advantage in increase in observable tank volume. Additionally, the customer cannot observe the contents of the upper tanks as closely without leaning over the lower tanks, which is inconvenient, and therefore undesirable.

Servicing of the above described stepped displays, including for example adding or retrieving species of aquatic life for sale, cleaning the aquarium tanks, etc, is more difficult as personnel performing servicing tasks must somehow lean, or be supported, over the lower aquarium tanks in accessing the upper tanks. Also, the stepped supporting structure of such displays is necessarily more complex and therefore more costly.

Furthermore, the cost of constructing the support frame for an aquarium display is only one facet of the cost of manufacturing aquarium displays. Aquarium displays typically incorporate numerous individual display tanks. Of course at least one side of each display tank must be clear, and this is usually done by providing tank walls formed of clear glass or plastic.

Forming tanks using these materials usually involves high labor costs. Particularly, when plastic is used great care must be taken in forming and aligning the various wall, bottom and top members of the tank so that the pieces can be bonded together in a fluid tight manner. Moreover, when clear materials are joined together care must be taken to insure that the joint is done so that the appearance of the joint will be pleasing and not distract from the appearance of the display tank. This is particularly important in retail displays. Since aquarium displays typically incorporate numerous tanks, the cost of manufacture of the tanks is a large component of the cost of the entire display.

Hence, those concerned with the development and use of aquarium displays have long recognized the need for an improved aquarium display which will allow more water volume per unit of floor space at a low cost of manufacture and yet allow the customer to conveniently view the contents of all the aquarium tanks in the display. It has also been recognized that it would be desirable to have such a display be relatively easy to service and maintain. The present invention fulfills these needs.

SUMMARY OF THE INVENTION

Briefly, and in general terms, the present invention provides an improved aquarium display by providing front wall surfaces of aquarium tanks positioned relatively high or low relative to a viewer (for example in the top and bottom areas of a vertically stacked aquarium display) with an inclination, angled at an oblique angle from a horizontal or vertical plane. Angling the tank wall surfaces toward a viewer in an upper area of the display and away from a viewer in a bottom area of the display, respectively, allows the viewer positioned relative to the display close enough so as to easily observe species in the display to see substantially all of the water volume within these tanks due to refraction of light passing through the inclined front wall surfaces. This makes essentially the entire volume of such relatively high or low positioned tanks observable.

The degree of slope of the front tank faces is chosen relative to the particular height of each tank, and to avoid glare from overhead lighting interfering with the view of such a customer. Thus differing slopes of the front surface can be used for tanks of differing relative heights in the display.

A cantilevered supporting structure is provided that eliminates the need for supporting posts in the front of the display that would otherwise take up room and obstruct the view of an observer. A library-style ladder is incorporated in the display so that servicing the display is made easier.

The display incorporates interchangeable decorative panels that encapsulate lighting fixtures in the display to reduce glare, improving the lighting of the display for viewing. The panels can be easily replaced to change the appearance of the display.

The individual display tanks incorporated in the display are constructed of plastic and have a simplified construction wherein multiple sides of the tanks are formed of a single member, allowing faster and easier assembly, thereby reducing the cost of the display.

Other features and advantages of the invention will become apparent from the following detailed description, taken in conjunction with the accompanying drawings, which illustrate, by way of example, the features of the invention.

DESCRIPTION OF THE DRAWINGS

FIG. 3 is a perspective elevational view of an individual display tank according to the invention;

FIG. 4 is a sectional view, taken along line 4—4 in FIG. 3, of a portion of an individual display tank according to the invention;

FIG. 5 is an enlarged sectional view of the portion of FIG. 4 indicated by the circle and numeral 5, showing details of construction;

FIG. 6 is an enlarged perspective elevational view, partially in section, of a portion of the tank shown in FIG. 3;

FIG. 7 is an exploded perspective view of the tank of FIG. 3, showing assembly;

FIG. 8 is an exploded perspective view of a display tank according to the invention, showing assembly;

FIG. 9 is a sectional view, taken along line 9—9 in FIG. 8, of a tank according to the invention; and FIG. 10 is an enlarged perspective view, partially in section, of a portion of the tank shown in FIG. 8.

DETAILED DESCRIPTION OF THE PREFERRED EMBODIMENTS

Figure 1:
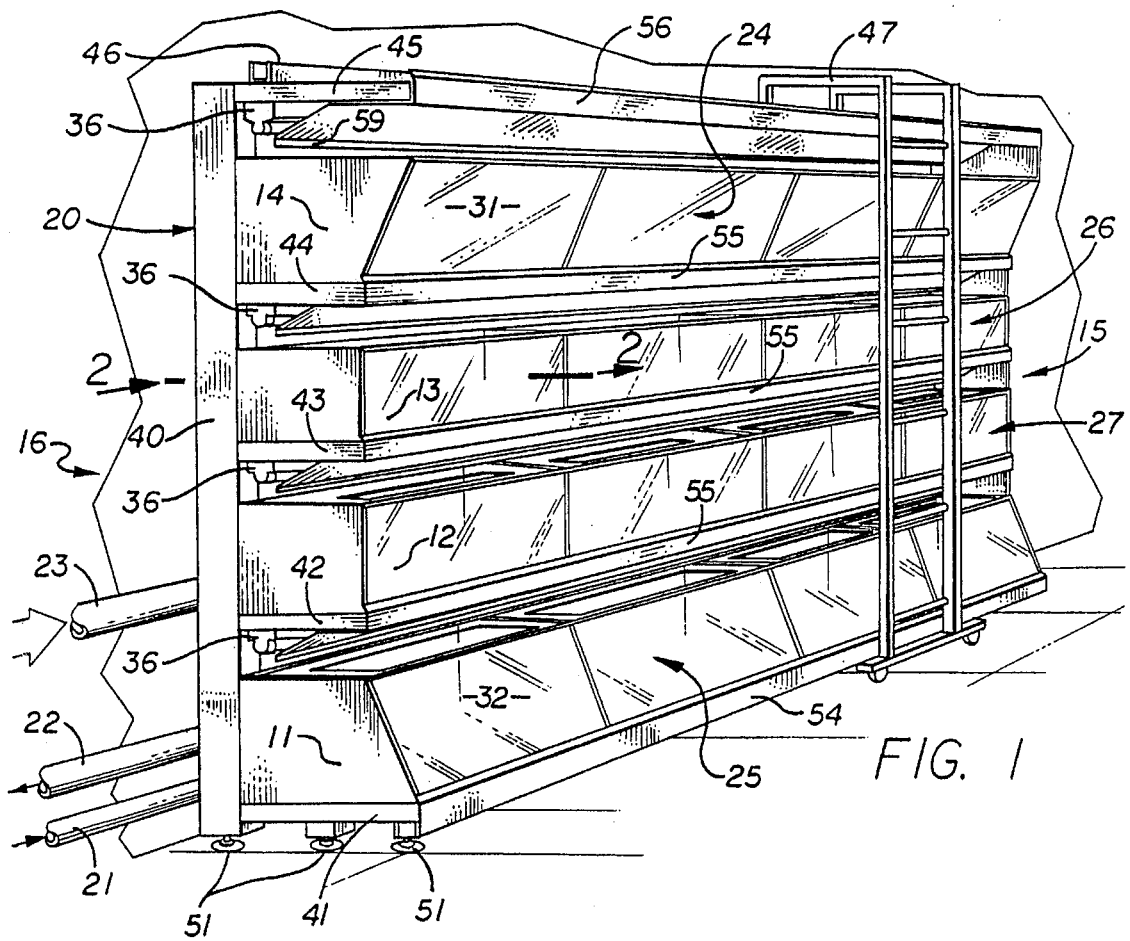
FIG. 1 is a perspective elevational view of the vertically stacked aquarium display according to principles of the invention.

As shown in the drawings for purposes of illustration, and not by way of limitation, the invention is embodied in an improved vertically stacked aquarium display 10 of the type where multiple aquarium tanks 11, 12, 13, and 14 are displayed vertically one above the other so as to maximize the display volume of water per square foot of floor space used. The aquarium display may be used in an aisle or wall display and can be serviced from a front side 15, and water supply 21 and return 22 conduits, as well as an air supply conduit 23 can be connected to the tanks in the display from a rear side 16.

In accordance with the present invention, tanks such as tank 14 in a top row of aquarium tanks 24, and tanks such as tank 11 in a bottom row 25, each have inclined transparent front surfaces 31 and 32 which allow a viewer of average height to see essentially the entire volume of water contained within tanks in the upper row 14 and bottom row 11 due to refraction of light through the angled front surfaces. Further, the display 10 according to the invention which thus utilizes the top and bottom areas of the vertically stacked aquarium tank system provides a significant increase in water volume per square foot of floor space area over the prior art.

Referring to FIG. 1, in the currently preferred embodiment a welded steel supporting rack 20 supports rows of aquarium display tanks 24, 25, 25, and 27 formed of acrylic plastic, fiberglass decorative fascia members of differing types 33, 34, and 35, and a fluorescent light fixture 36 for each row, to form a display unit 10. Use of these rugged component parts gives the aquarium display 10 a long useful life under the adverse conditions of humidity and service inherent in a display of this type. Also, when properly set up, the welded rack construction provides improved stability, which is particularly important in earthquake prone areas.

The supporting rack 20 provides a welded steel cantilevered support arrangement by a series of regularly spaced column members 40 at appropriate intervals, from which horizontal tank support members 41, 42, 43, and 44 extend to support aquarium display tank rows 24, 25, 26 and 27. The cantilever support means of the welded steel rack 20 eliminates the need for unattractive support posts incorporated in the front side 15 of the display unit 10. Further, a horizontal member 45 at the top of the display supports a ladder track 46 provided to enable a library style rolling ladder 47 to be used to service the display 10. As an alternative to the ladder shown in FIG. 1, a library style rolling step ladder incorporating stair treads (not shown); a platform (not shown); and a handrail (not shown) may be used.

Horizontal support members 41, 42, 43, and 44, as well as horizontal member 45 comprise shelves formed of steel box tube, and are welded to each column member 40. Alternatively, other connection means such as the use of fasteners, or provision of sockets in each column member 40 to receive the various horizontal support members may be employed. Also, other materials may be used in forming the support structure as will be apparent to one skilled in the art.

The welded steel support rack 20 of the display unit 10 of the illustrated embodiment supports 4 separate tanks in each of the rows 11, 12, 13, and 14. Each tank is about 2 ft. (0.61 m) long for an overall length of the illustrated display unit 10 of about 8 ft. (2.4 m). Display units 10 can be placed side-by-side to create longer displays. Column members 40 are 2×5 inch steel box tube spaced at about 2.66 feet (0.81 m). Horizontal support members 41, 42, 43, 44, and horizontal member 45 are 2×2 inch steel box tube frame, with a cantilever section of steel box tube extending from each column member 40 for each shelf member 41, 42, 43, 44, and top horizontal member 45, interconnected by transverse longitudinal box tube.

Each horizontal support member 41, 42, 43, and 44 formed of steel box tube may have additional stringer members or a plate member (both not shown) welded therein. This structure provides support in areas within the outer periphery of the horizontal support member defined by steel box tubing to help support the bottom of each display tank (e.g. 11, 12, 13, and 14).

Leveling of the aquarium display unit 10 in the illustrated embodiment is provided by use of threaded vertically adjustable footpads 51 positioned at the bottom of each column member 40 and the bottom horizontal shelf member 41. Three footpads are positioned adjacent each column member to more evenly distribute the weight of the large water volume per unit area of floor space resulting from the improved configuration of the display 10.

An air supply line 23, as well as water supply 21 and return 22 lines are connected to each aquarium tank in a conventional manner on the back side 16 of the display unit 10. These supply lines are connected to a remote compressor and water circulation and treatment unit (not shown) of sufficient capacity to accommodate the number of display units 10 in a particular installation.

Incorporated on the front side 15 of the display unit 10 are several types of decorative fascia members 54, 55, and 56 which protect portions of the display and also improve its aesthetic appearance. The front side 15 of these several types of fascia members 54, 55, and 56 may be given a uniform textured appearance for example. The fascia members may incorporate means (not shown) for displaying information such as species identification, price, etc. as is common in retailing and well known in the art. Fiberglass material is currently preferred for construction of the fascia members, but other materials such as steel, aluminum, wood or plastics may be employed.

These fascia members also cooperate with fluorescent light fixtures 36 positioned above each row of aquarium tanks 24, 25, 26, and 27 to provide improved lighting of the display, including functioning to reduce glare from the light fixtures 36. Another purpose of the fascia members is to protect the light fixtures from contact by persons and objects in servicing the display from the front side 15.

The bottommost fascia member 54 shields the adjustable foot members 51 and bottommost horizontal support member 41 from view, and helps protect the bottom of front surface 32 of the bottommost row 25 of aquarium tanks from contact with objects such as shopping carts. This fascia member improves the appearance of the bottom of the front side 15 of the display giving it a appealingly uncluttered look which is desirable in retail applications.

Fascia member 56 at the top of the display unit 10 shields the top horizontal member 45 from view, as well as the library ladder track 46 and a light fixture 36. This fascia member covers the front of horizontal member 45 and then extends horizontally along the underside of the horizontal member. From the underside of the horizontal member, the facia member then turns down at an inclined angle to provide clearance for the light fixture, finally again turning down to a vertical flange portion 59 which both shields the light fixture 36 and acts to stiffen the fascia member 56. Fascia member 56 at the front side 15 of horizontal member 45 is even with the top corner of front surface 31 of the topmost row of aquarium tanks 24. This gives the display unit a finished and aesthetically pleasing appearance.

The horizontal support members 42, 43, and 44 intermediate the top horizontal member 45 and the bottom support member 41 are each covered by a fascia member 55 as well. The fascia member 55 which is used on the bottom of aquarium tank rows 24, 26 and 27 (which cover horizontal support members 42, 43 and 44) is of the same configuration in each case, as the horizontal support members are of the same size. These fascia members also shield the bottom front corner of each tank (e.g. 12, 13 and 14) in the row of aquarium tanks 24, 26 and 27 from view and from contact by objects. The fascia member 55 also shields the light fixture 36 associated with each row as before described in connection with the top fascia member 56, and fascia member 55 is of the same overall configuration as fascia member 56 described above but with slightly different dimensions.

Figure 2:
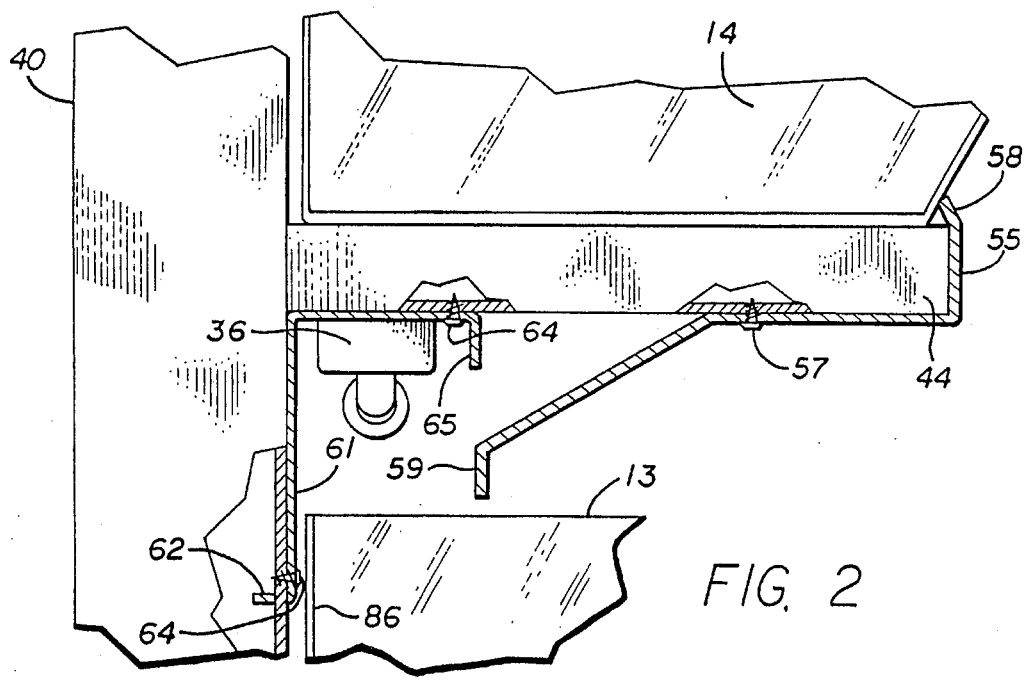
FIG. 2 is an enlarged fragmentary sectional view, taken along line 2—2 of FIG. 1.

Referring to FIG. 2, the fiberglass fascia member 55 is attached to horizontal shelf support 44 by a single row of fasteners 57, which in the illustrated embodiment are metal screw fasteners received in pre-drilled holes in the bottom of horizontal shelf support member 44. Other fasteners could be used, for example pop-in plastic rivets, or threaded holes and bolts. Alternatively, more readily releasable attachment means can be employed, for example VELCRO® (a registered trademark of Vecro Industries, B.V., a Netherlands/Holland Corporation) or magnet strips can be used between the fascia member and the shelf support to provide a releasable attachment.

A bent portion 58 of the fascia member engages horizontal support 44 on the front side 15, and this configuration, cooperating with the fasteners 57 arranged in a single row, securely attaches the fascia member 55. Nevertheless, the fascia member can be quickly removed by removing the single row of fasteners. This makes servicing the light fixture 36 very easy, as well as changing the fascia member 55 for a new one. This configuration and method of attachment, or one of the above alternatives, is used in fastening fascia members 55 and 56 to horizontal members 42, 43, 44 and 45.

Referring again to FIG. 1, bottom fascia member 54 does not shield a light fixture 36, and is simply attached by fasteners (not shown) which may be for example strips of VELCRO®, or strips of magnet material which releasably secures the fascia member to the steel horizontal member 41 in a conventional manner. If screw fasteners, or rivets, or the like, which are visible to an observer are used, the fasteners are preferably covered or color-keyed to the fascia member so as to be less visible. This is done in connection with fascia members 55 and 56 as well.

As mentioned, the fascia members 54, 55 and 56 can be easily removed and replaced. A significant advantage of the configuration of the aquarium display system illustrated in FIGS. 1 and 2 is that each of types of fiberglass fascia members 54, 55, and 56 can be easily replaced by another fascia member having a different appearance. Thus the appearance of the display unit 10 can be changed quickly and easily by simply exchanging the fascia members for new ones performing the same function but having a different appearance.

Referring again to FIG. 2, a metal flashing 61 is used in conjunction with, and to support, the light fixture 36 on the underside of horizontal shelf member 44. This metal flashing shields the area behind the display unit 10 from view from an observer facing the front side 15 of the display by covering the area between the horizontal member 44 and the tank row 26 below it. This same flashing configuration is used in conjunction with each light fixture 36. Thus the area behind the display unit 10 is completely hidden by the tanks (e.g. 11, 12, 13, and 14) and each of the flashing members 61 covering the spaces between the tanks (which preferably have an opaque rear wall 86) and the horizontal members above them. The surface of the flashing 61 on the front side 15 may be treated to give a pleasing aesthetic appearance. For example, the flashing 61 may be painted, or coated with a textured coating.

The metal flashing is attached to the horizontal shelf member 44 and column member 40 of the welded steel support rack 20 by means of metal screw fasteners 64 in a conventional manner. This same arrangement is used in conjunction with each light fixture 36 attached to the underside of horizontal members 42, 43, 44, and 45.

The metal flashing member 61 can be formed of aluminum, for example, or other metals. It can also be formed of plastic, or a composite material such as fiberglass. A flange 62 extends the length of the flashing member 61. The flange is interrupted at each column member 40 to provide clearance for the column member. A second flange 65 is incorporated in the flashing member 61 to further stiffen the flashing member.

This overall construction of the aquarium display unit 10 results in an aquarium display unit which is more rugged and attractive over a longer service life than is possible with prior art displays. The easily interchangeable components of the display also lengthen its service life by allowing the appearance of the display to be periodically updated.

Referring again to FIG. 1, the front faces 31 and 32 of the aquarium tanks 14 and 11 in the top 24 and bottom 25 rows, respectively, are angled to provide an observer with a view of more of the volume of water contained within these tanks due to refraction of light traveling through inclined surfaces 31 and 32 to the viewer. In the illustrated embodiment, both a wall surface 31 of a top row tank 14 and a wall surface 32 of a bottom row tank 11 are disposed at an oblique angle to the horizontal support members 41 and 44 and a bottom wall of each tank (not shown) which rests on each of the support members. The oblique angle from a horizontal reference plane, which in the illustrated embodiment is parallel to bottom of the aquarium tank or the top of the horizontal member, in each instance is about 68°. Top tank front wall surface 31 is inclined out over the front of the display toward a viewer or viewing position adjacent the front side 15 of the display, and bottom tank front wall surface 32 is inclined away from the viewer toward the rear of the display, as referenced from the front side 15 of the display unit 10.

As will be apparent to one skilled in the art, the angles employed may be adjusted in different applications. It has been found that the approximately 68° angle from the horizontal, corresponding to a horizontal departure of 6 inches (15 centimeters) in a vertical departure of 15 inches (38 centimeters), allows a good view of the water volume in both the upper 24 and lower 25 rows of aquarium tanks in a display approximately 7 feet (2 meters) high. These figures are based upon a customer of average height of from 5 to 6 feet (1.5 to 1.8 meters) viewing the display from a viewing location an appropriate distance of 1 to 6 feet (0.3 to 1.8 meters) in front of and facing the front side 15 of the display unit 10. It has also been found that using these angles, undue glare from overhead lighting separate from the display (not shown) does not unduly interfere with viewing the water volume of these angled tanks. The inclination of the front walls 32 of the bottom row 25 of tanks is of particular concern in this regard.

In a presently preferred embodiment, the bottom row 25 of aquarium tanks is about 15 inches (38 cm) high and rests on the top surface of horizontal support member 41 placed from 4 to 6 inches (10 to 15 cm) above the floor. The top row 24 of aquarium tanks is also about 15 inches (38 cm) high and rests on the top surface of horizontal shelf member 44 which is placed from 65 to 67 inches (165 to 170 cm) from the floor.

The clearance provided between the horizontal members 41, 42, 43, 44, and 45 and the tops of the tanks (e.g. 11, 12, 13, and 14) in the rows of aquarium tanks 24, 25, 26, and 27 is in all cases about 6 inches (15 cm). This clearance provides access to the contents of the aquarium tanks in the display unit 10 for servicing.

Two rows 26 and 27 of aquarium tanks (e.g. tanks 12 and 13) are provided in between top row 24 and bottom row 25 at an even spacing. Each of the aquarium tanks in the upper middle row 26 and the lower middle row 27 is about 11 inches (28 cm) height. Other tank heights, as well as other dimensions for the display can be used, as will be apparent to one skilled in the art. This described exemplary configuration gives a pleasing appearance, again which is significant in retail applications.

In the presently preferred embodiment, each aquarium tank (e.g. 11, 12, 13, and 14) used in the display unit 10 in the illustrated embodiment is formed of an acrylic plastic. As will be apparent to one skilled in the art, other materials, such as glass, may be used. Also, in the illustrated embodiment, the tanks in each row abut each other to give the appearance of a continuous tank for each row, sectioned off into compartments for displaying various species. Each tank is about 2 feet (61 cm) long, and four tanks make up each row, 24, 25, 26 and 27 of the illustrated display unit 10.

Referring to FIG. 3, an individual tank 11 such as would be used on the bottom row 25 of the display unit 10 is shown for purposes of illustrating a presently preferred construction for the individual display tanks 11, 12, 13, and 14. Although a tank for use on the bottom row 25 is shown, the following description can be applied to the display tanks configured for use in any row 24, 25, 26, and 27 (e.g. tanks 11, 12, 13, and 14).

The top and front sides of the tank 11 are formed of a single piece of clear acrylic plastic 69, while the back and bottom are formed of a single piece of opaque acrylic plastic 70. Each of the two sides of the tank are formed by single pieces of opaque acrylic plastic 71 and 72. The opaque pieces can be colored as desired, and in the presently preferred embodiment are blue in color. A cut-out portion 73 is provided in the clear acrylic front and top member 69 at the top of the tank for servicing the tank when in use in the assembled display 10.

Referring to FIGS. 4 and 5, the clear acrylic member 69 is sealingly joined to the opaque bottom and back member 70 at the bottom front corner 74 and the top rear corner 75. The pieces forming the tank 11 are joined together using a conventional solvent welding process. Alternatively, adhesive 76 may be used to join the tank members. At each corner 74 and 75 the clear acrylic front and top member 69 is placed on top of the bottom and back member 70. This is further shown in FIG. 6.

Referring now to both FIGS. 6 and 7, the tank 11 is formed in a simplified manner which greatly speeds construction, and allows better quality control. First, the clear acrylic member 69 forming the top and front of the tank is cut to the correct size, and the cut-out portion 73 is formed in the appropriate location. Thereafter the plastic piece is heated and bent in a conventional manner to form a top front corner 77. The opaque plastic bottom and back member 70 is formed by cutting to size, and bending the sheet of plastic as before described to form a bottom rear corner 78. These two plastic pieces are then sealingly joined together as before described.

Next, side pieces 71 and 72 are sealingly butted to the open ends of the joined members 69 and 70 forming the top, front, bottom, and back of the tank 11. These side pieces are also joined by solvent welding. These few simple steps complete the assembly of the tank. Any additional steps, such as cutting out holes for water and air supply and return connections (not shown) in the member 70 at the back of the tank can be performed before assembly.

Referring to FIGS. 8, 9 and 10, a variation of the tank 11 configuration is to form the top, front, and bottom of the tank from a single piece 85 of clear acrylic plastic. Again, in forming each tank a cut-out portion 73 is first made in a clear plastic piece which has been cut to size to form the top, front, and bottom of the tank. The clear acrylic piece 85 is then bent in two places to form a top front corner 77 and bottom front corner 74 of the tank. This operation thus forms a single clear acrylic member 85 comprising the top, front, and bottom of the tank.

After this operation, an opaque piece of plastic 86 (again preferably blue in color) cut to shape to form the back of the tank 11 is inserted between the top and bottom portions of the clear tank member 85 and sealingly joined as before described. This back piece may have preformed holes (not shown) for connection of water supply and return and air lines as before described. Each of two side pieces 71 and 72 are then sealingly butted to the sides of the tank to complete the construction as before described.

Thus, in this tank embodiment (as well as the other described embodiments) the tank 11 having six sides is formed of only 4 members. The bends in the members are made before assembly and define the shape of the tank, eliminating the need for the assembler to orient the sides relative to one another. This construction for each aquarium tank used in the display (e.g. 11, 12, 13, and 14) requires much less labor than previous methods employed, and results in an aquarium tank of higher and more uniform quality. This reduces the time and cost involved in fabrication and assembly of the display unit 10 incorporating many such tanks, and results in a higher quality display.

Furthermore, tanks 11 having this construction are more aesthetically pleasing when incorporated into the aquarium display 10, as the top front corner 77 of the tanks do not have an unsightly glued joint. The bottom front corner 74 has a joint in the tank embodiment shown in FIG. 3, however this joint is hidden by the fascia member 54, 55 or 56 in the assembled display, and the tank embodiment of FIG. 8 has no joint at the bottom front corner 74.

From the foregoing, it will be appreciated that the aquarium display unit 10 of the present invention provides an improvement in cost efficiency by providing an aquarium display system configuration that allows more water volume per unit floor space to be accommodated, at a lower cost of manufacture, and which will last longer under the operating conditions attendant such display units. Furthermore, improved convenience to customers and personnel who will service the display is achieved by making the contents of the display more readily viewable and accessible. Also, the longevity of the display is enhanced by the provision of interchangeable fascia members 54, 55 and 56 which can be replaced to change the appearance of the display.

While a particular form of the invention has been described, it will be apparent that various modifications can be made without departing from the spirit and scope of the invention.

What is claimed is:

1. An improved aquarium display system of the type comprising a plurality of aquarium tanks stacked vertically, having a front side viewable from a viewing location facing said front side, and a rear side, the improvement comprising:

at least one of said plurality of aquarium tanks having a transparent front viewing wall, said transparent front viewing wall being inclined at a selected oblique angle with respect to a horizontal reference plane, said inclined transparent front viewing wall refracting light passing therethrough so that the volume within said aquarium tank is more fully viewable from the viewing location due to a light refraction effect caused by the inclination of the transparent front wall of said aquarium tank, said selected amount of inclination being chosen based upon the relative vertical and horizontal displacements of the front viewing wall and the selected viewing location;

the plurality of aquarium tanks being supported from the rear side by a cantilevered support rack formed of welded steel to provide a front of the display uncluttered by vertical supports;

said support rack further comprising a library ladder track, and said display further comprising a library ladder mounted in said library ladder track enabling convenient access to high portions of the display.

2. The aquarium display of claim 1, further comprising a removable fascia member, carried by said cantilevered support rack, for covering a portion of the display.

3. The aquarium display of claim 2, wherein the facia member shields a portion of the front wall of an aquarium tank of said plurality of aquarium tanks.

4. The aquarium display of claim 1 further comprising a lighting fixture removable connected to said cantilevered support rack above at least one of said plurality of aquarium tanks for illumination of the aquarium tank.

5. The aquarium display of claim 4, further comprising a facia member carried by said cantilevered support rack which shields said lighting fixture.

* * * * *